(12) United States Patent
Meiners et al.

(10) Patent No.: US 6,215,093 B1
(45) Date of Patent: Apr. 10, 2001

(54) SELECTIVE LASER SINTERING AT MELTING TEMPERATURE

(75) Inventors: Wilhelm Meiners, Aachen; Konrad Wissenbach, Herzogenrath; Andres Gasser, Aachen, all of (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/319,132
(22) PCT Filed: Oct. 27, 1997
(86) PCT No.: PCT/EP97/05935
  § 371 Date: Jul. 12, 1999
  § 102(e) Date: Jul. 12, 1999
(87) PCT Pub. No.: WO98/24574
  PCT Pub. Date: Jun. 11, 1998

(30) Foreign Application Priority Data

Dec. 2, 1996 (DE) .............................................. 196 49 865

(51) Int. Cl.[7] .................................................. B22F 3/105
(52) U.S. Cl. ................................ 219/121.61; 219/121.84; 219/121.85; 419/47
(58) Field of Search .......................... 219/121.6, 121.61, 219/121.62, 121.65, 121.66, 121.84, 121.85; 419/47, 57; 427/594; 264/125, 308

(56) References Cited

U.S. PATENT DOCUMENTS

| | | | |
|---|---|---|---|
| 4,752,352 | * | 6/1988 | Feygin . |
| 5,156,697 | * | 10/1992 | Bourell et al. ........................ 264/497 |
| 5,314,003 | * | 5/1994 | Mackay ................................ 164/494 |
| 5,437,820 | * | 8/1995 | Brotz .................................... 264/497 |
| 5,745,834 | * | 4/1998 | Bampton et al. ...................... 419/37 |
| 5,855,149 | * | 1/1999 | Islam et al. ........................... 76/107.8 |

FOREIGN PATENT DOCUMENTS

PCTUS9109313  12/1991  (WO) .

OTHER PUBLICATIONS

"Laserstrahl–Sintern zur Herstellung von Blechumform–werkzeugen", Blech Rohre Profile, 43 (1996) 6.

* cited by examiner

Primary Examiner—Patrick J. Ryan
(74) Attorney, Agent, or Firm—Milde, Hoffberg & Macklin, LLP

(57) ABSTRACT

A method is disclosed for manufacturing a molded body, in accordance with three-dimensional CAD data of a model of a molded body, by depositing layers of a metallic material in powder form. Several layers of powder are successively deposited one on top of the other, whereby each layer of powder is heated to a specific temperature by means of a focused laser beam applied to a given area corresponding to a selected cross-sectional area of the model of the molded body, before deposition of the next layer. The laser beam is guided over each layer of powder in accordance with the CAD cross-sectional data of the selected cross-sectional area of the model in such a way that each layer of powder is fixed to the layer below it. The method is characterized in that the metallic material in powder form is applied in the form of a metallic powder free of binders and fluxing agents, that it is heated by the laser beam to melting temperature, that the energy of the laser beam is chosen in such a way that the layer of metallic powder is fully molten throughout at the point of impact of said laser beam, that the laser beam is guided across the specified area of powder in several runs in such a way that each run of the laser beam partly overlaps the preceding run, and that a protective gas atmosphere is maintained above the interaction zone of the laser beam and the metallic powder.

23 Claims, 5 Drawing Sheets

FIG. 1

SELECTIVE LASER SINTERING AT MELTING TEMPERATURE

BACKGROUND OF THE INVENTION

The present invention relates to a method for manufacturing a molded body, particularly a prototype of a product or component, a tool prototype or spare part, in accordance with three-dimensional CAD data of a model of a molded body by depositing layers of a metallic material in powder form. Several layers of the powder are successively deposited one on top of the other, whereby each layer of powder is heated to a specified temperature by means of a focused laser beam applied to a given area corresponding to a selected cross-sectional area of the model of the molded body, before deposition of the next layer. The laser beam is guided over each layer of powder in accordance with the CAD cross-sectional data of the selected cross-sectional area of the model in such a way that each layer of powder is fixed to the layer below.

The increasing competitive pressure forces companies more and more not only to manufacture more economically with a constant high product quality but also to save time and costs in the area of product development. The life span of products is continuously shortened. In addition to product quality and product costs, the moment of market introduction is becoming increasingly important for the success of a product.

In many industry branches, it is necessary to manufacture prototypes prior to high-volume production, in order to install them already for testing purposes as functional components in test arrangements. Preferably, such prototypes correspond to the serial products not only in shape but should also be as close as possible to the serial product with regard to the material to be able to test such prototypes during the application.

For the above mentioned reasons, a technology for the above mentioned purposes has developed that is known as stereo lithography. Within the scope of stereo lithography, a prototype to be manufactured is divided into individual layers and the data of the individual layers concerning the prototype to be manufactured are supplied to a manufacturing device. Such a manufacturing device consists of a liquid bath with a UV hardening liquid that a UV beam sweeps over according to the contours and fields of the prototype to be manufactured in order to harden the liquid. Then, this initial layer is lowered to a defined layer thickness in order to harden a second coating on to it in accordance with the established data. Layer by layer this process continues until the entire model or prototype is created. Thin pipe walls, hollow cavities or intertwined components can be manufactured in a manner that corresponds to the serial product. Depending on the degree of partitioning of the layers, that is, the thickness of each layer that is hardened, even curvatures can be built in detail.

Aside from the stereo lithography where synthetic materials are hardened or polymerized using UV light, a method of building a prototype of sintered metallic material in powder form is known. Such a method is described in the International Patent Publication No. WO 92/10343. According to the method described in this document, in order to manufacture a component, a first layer of powder that can be sintered is deposited and the powder is sintered according to the layer areas of the part to be manufactured. Then, this method is repeated in a manner where each time a new layer is deposited on the previously sintered layer and where these layers correspond to the respective layers or cross-sectional areas of the component to be manufactured.

Known from "Heinz Hasenkampf et al, Laserstrahl-Sintern zur Herstellung von Blechformwerkzeugen "Laser Beam Sintering of Sheet Metal Forming Tools" in the magazine "BLECH ROHRE PROFILE" [SHEET METAL PIPES PROFILES], 43, 1996, pages 317 to 319, is a method for building up metal structures in layers by localized sintering, or melting together, of previously deposited metal powder layers using a focused laser beam. The metal structures are manufactured of materials in powder form without binding agent additives utilizing the melting phase, where several layers, each 0.1 to 0.2 mm in thickness, are deposited one on top of the other and are each radiated with a laser beam in a protective argon gas atmosphere.

A common disadvantage of the methods available on the market today, such as stereo lithography or sintering of metal powders, is that they cannot be used to manufacture metallic prototypes directly that can be employed in operational applications, for example, exhaust pipe elbows of a motor vehicle. The manufactured components are made of synthetic materials, metal, wax or paper that do not permit operational functional tests, particularly at high temperatures and high stress.

Concerning the sintering method, as it is also known from the document noted above, there are basically two methods currently pursued, one is direct sintering and the other is indirect sintering. With indirect sintering, the metallic powder material is sheathed with a polymer or with another sinterable sheathing material, such as a sintering agent that is necessary for such metals that by themselves are not sinterable. In the sintering process, only the polymer material or the sheathing material which is melted on or sintered and in this process binds the metal particles. However, the so-called blank manufactured in this manner still needs to undergo after-treatment in a separate process, for instance, surface smoothing or burning out of the binding agent made of polymer material. Alternatively, often such components must be densified and hardened by post-sintering and infiltration, which can result in shrinkage and deformation. With direct sintering, the powder mixture consists of a low melting point and a high melting point material. In processing, only the low melting point component is melted on and it functions as a binding agent-for the high melting point powder particles. This process has the disadvantage that the manufactured components have a density of less than about 80% and a low strength. Thus, a direct test or an employment of the component under operational or even extreme test conditions is not possible with this method variation as well.

A common disadvantage of the methods available on the market today, such as stereo lithography or sintering of metal powders, is that they cannot be used to manufacture metallic prototypes directly that can be employed in operational applications, for example, exhaust elbows of a motor vehicle. The manufactured components are made of synthetic materials, metal, wax or paper that do not permit operational functional tests, particularly at high temperatures and high stress.

Concerning the sintering method, as it is also known from the paper noted above, there are basically two methods currently pursued, one is direct sintering and the other is indirect sintering. With indirect sintering, the metallic material in powder form is sheathed with a polymer or with another sinterable sheathing material, such as a sintering agent that is necessary for such metals that by themselves are not sinterable. In the sintering process, only the polymer material or the sheathing material is melted on or sintered and in this process binds the metal particles. However, the so-called blank manufactured in this manner still needs to undergoes after-treatment in a separate process, for instance surface smoothing or burning out of the binding agent made of polymer material. Alternatively, often such components must be densified and hardened by post-sintering and infiltration, which can result in shrinkage and deformation. With direct sintering, the powder mixture consists of a low melting point and a high melting point material. In processing, only the low melting point component is melted on and it functions as binding agent for the high melting point powder particles. This process has the disadvantage that the manufactured components have a density of less than 80% and a low strength. Thus, a direct test or an employment of the component under operational or even extreme test conditions is not possible with this method variation as well.

SUMMARY OF THE INVENTION

Starting from the state-of-the-art mentioned above as well as the above-stated difficulties that arise from the conventional methods, it is the principal object of the present invention to manufacture molded bodies, particularly prototypes of a product or component that allow for testing under conditions that at minimum correspond to those that the serial product shall be exposed to, and where this prototype shall at least approach the final product in its strength and density and shall especially not require extensive reworking steps.

Starting with the method mentioned above, according to the invention this object is achieved in that the metallic powder material is applied in the form of a metallic powder free of binding and fluxing agents, that it is heated by the laser beam to melting temperature, that the energy of the laser beam is chosen in such a way that the layer of metallic powder is fully molten throughout its layer thickness at the point of impact of said laser beam, that the laser beam is guided across the specified area of the powder material layer in several runs in such a way that each run of the laser beam partly overlaps the preceding run, and that a protective gas atmosphere is maintained above the interaction zone of the laser beam and the metallic powder.

Due to the fact that the metallic powder material is free of binding and fluxing agents and that each time it is heated to its melting temperature, the metallic powder material is fully molten throughout its layer thickness such that a very dense molded body of high strength can be manufactured that allows for testing under operational conditions, that is both at high temperatures, depending on the metal type that the used powder consist of, and at high mechanical stress. It is important in this regard that the layer of metallic powder material penetrates to the already molten layer located underneath, along the runs that the laser sweeps over during the melting process, such that neighboring areas melt into each other and that, therefore, grooves or other transitional areas are not created. Through this overlapping, the melt of the powder and the melt of the neighboring, solid contour that was molten previously or that is located under the powder layer, are molten together to a combined melting bath, where then the melting bath forms a melt-metallurgical bond and then, after hardening, forms a homogenous structure.

In this regard, it is also important to maintain a protective gas atmosphere during the process in the interaction zone between the laser beam and the metallic powder material in order to avoid defects such as ones caused by oxidation. Not only is it possible with the method subject to the invention to manufacture high-strength and very dense components, but the method also offers the possibility, practically regardless of the material, to employ various metallic materials in powder form, for example, stainless steel, aluminum or titanium, to name a few of the most significant of these close-to-production and, compared to conventionally used sinter materials, high melting point materials that are employed today. The powders do not need pre-treatment rather it is possible to use powders, without great limitations, that are available on the market. The only limitation that must be observed is that the metallic powder material must be of sufficiently fine grain to be able to build sufficiently thin individual layers.

As already stated above, it is important that the run distance of neighboring runs, that is, the distance that is molten by the laser beam, is selected such that the runs overlap in such a manner that each subsequent melting run is molten into the previous run by melting a sufficiently wide zone even including the already hardened run. With regard to this measure, a run distance $\Delta y_s$ of neighboring runs according to the formula $2 > d_s/\Delta y_s > 1.5$ has proven to be advantageous, where $d_s$ is the diameter of the laser beam in the plane of the melt. Additionally, the diameter of the laser beam should be in a range between 0.2 and 0.5 mm, preferably about 0.35 mm. Assuming a laser beam diameter of, for example, 0.5 mm and considering the condition named above, the laser beams overlap with 0.25 mm of its diameter of the hardened, previous run that is then re-melted.

It has been found that particularly good melting and bonding of the molten metal powder with the previously hardened and re-melted run can be achieved, when the neighboring, hardened run has sufficient remaining heat such that the laser beam can heat it faster to the melting temperature. To achieve this, each layer of the layer-like structure of the molded body is divided into scanning vector lengths, which the laser beam sweeps in succession. This means that the laser beam moves only a short run length in one direction and then reverses its direction in order to return next to the previously molten powder layer. By this reversing sequence, the laser beam is guided right where the molten and hardened powder material is still strongly heated. Such a scanning vector length should be set to a maximum of 20 mm, preferably to 10 mm, that is, the laser beam only sweeps over a very short distance before it reverses its direction in order to scan parallel to its last run. Such a partition of each layer into individual partial areas and those in turn into individual scanning vector zones of specified length can be accomplished using data processing, that is, a data processing system partitions the areas such that the laser beam does not need to make jumps in the plane of the melt but can continuously cover the entire layer bit by bit in a manner as to optimally utilize the remaining heat that is still contained in previously molten layers.

It is additionally preferable to consider that the maximum scanning vector length is less than the width of the partial areas in the scanning direction of the laser beam, that is, the laser beam scans perpendicular to its scanning direction long, strip-like partial areas of the powder layer and melts these areas.

To support the interaction of the laser beam with the powder coating, the laser beam should be applied at an angle to the surface normal of the powder layer, preferably at an angle of 45°. Through this measure, the laser beam penetrates deeper into the metallic powder with the same laser power than would be the case if the laser beam were applied parallel to the surface normal of the powder layer.

To melt the powder uniformly such that each time sufficient zones of the already hardened material are re-melted in order to create a transitionless bond, the metal powder layers are applied at preferable thicknesses between 0.05 and 0.02 mm, with a preferred thickness of about 0.1 mm.

The scanning speed of the laser beam should be set to a value between 50 and 150 mm/sec, preferably to about 150 mm/sec.

The grain of the metallic powder material should be less than 100 $\mu$m, with a preferred average grain size of the graining of 10 to 50 $\mu$m.

Energy density values in the melt area should be sustained between 1 and 3 $J/mm^2$; such energy densities obtain good results with metals such as steel, titanium and aluminum.

The bond between the melt of the hard contour and the melt of the powder is often prevented by oxidation coatings and contamination of the surface of the melt. Thus, the oxidation of the melt, particularly caused by the oxygen in the air, should be avoided, and contamination removed from atmosphere around the processing zone through a suitable protective gas arrangement. For this purpose, a laminar protective gas stream is maintained across the surface of the molded body while the metallic powder material is molten to build the molded body. Examples for protective gases are nitrogen, helium or argon. A sufficient stream is required to be able to remove not only the gases that could cause oxidation of the respective metal surfaces in the area of the surfaces but also those gases that are embedded in the space between the metallic powder materials. These gases are then continuously removed by the protective gas streaming by, particularly also when these gases are set free when the metallic powder material is warmed up. The laminar stream additionally offers the advantage that the metallic powder material is not stirred up in the powder bed, which could be disadvantageous to the structure of the molded body. To cover the entire area of the molded body to be built with protective gases, the protective gas preferably is fed to the molded body from one side and removed from the other side, that is the opposite side of the molded body. To limit the protective gas stream volume and to define the laminar stream, the protective gas is maintained at a narrow volume above the molded body to be built up, preferably in a range of no more than 20 mm above the molded body. The protective gas should be kept at a pressure of greater than 0.1 MPa, preferably in a range between 0.2 and 0.6 MPa. If required, it is also possible to maintain a protective gas stream in the respective molten area using a nozzle; such a nozzle may then be guided together with the movement of the laser beam or from one partial area to the next one; additionally, there is the possibility to apply it within the partial area perpendicular to the scanning vector direction.

Additional details and features of the method subject to the invention as well as a device to carry out the method will become more readily apparent from the following description of exemplary embodiments with reference being made to the accompanying drawings.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
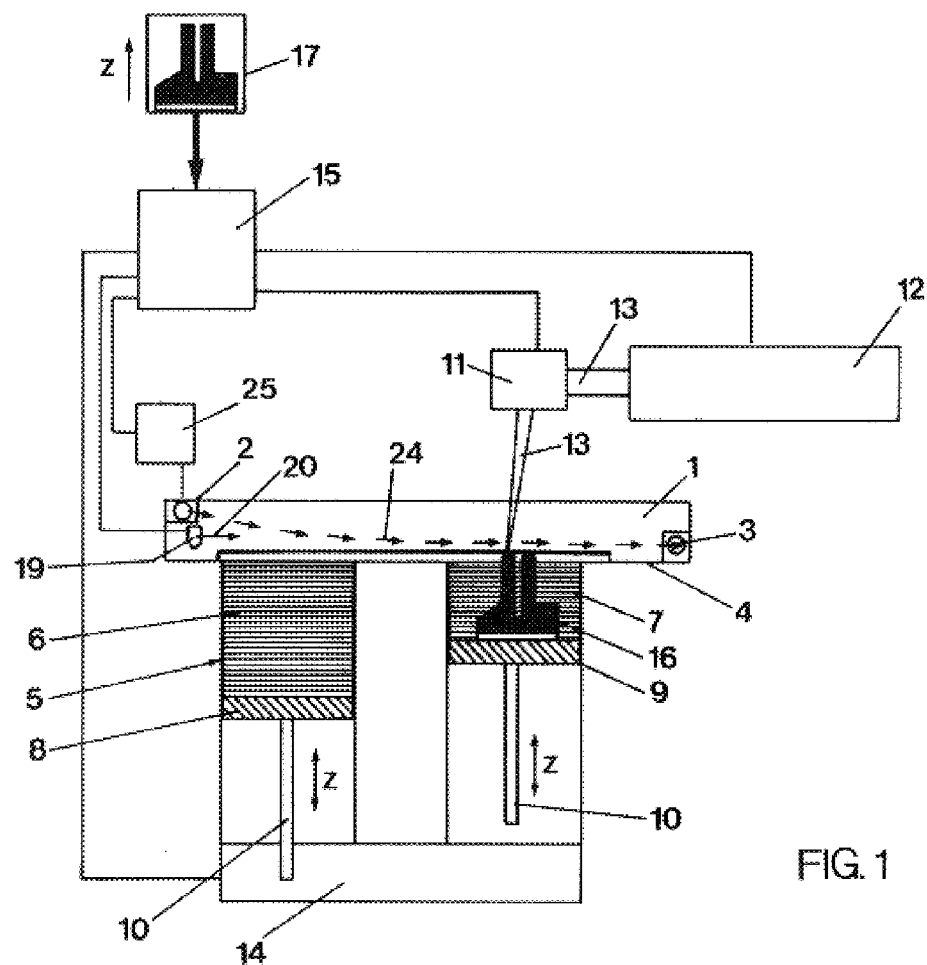
FIG. 1 is a schematic presentation of the device to manufacture a molded body according to method subject to the invention.

The present invention will now be described with reference to FIGS. 1–7B of the drawings. Identical elements in the various figures are identified by the same reference numerals.

As presented in FIG. 1, the device that is employed to carry out the method subject to the invention includes a process chamber 1, with a protective gas inlet 2 that is located in the area of the upper side edge of the process chamber 1, as well as a protective gas outlet 3 at the edge on the opposite side, located in the area of the ground surface 4 of the process chamber 1. Assigned to the ground surface 4 of the process chamber 1 is on the one hand a storage container 5, filled with metallic material in powder form 6, and on the other hand a build-up chamber 7. A lift table 8, 9 is located in each chamber 5, 7, where said lift tables can be moved each via a lift piston 10 in the z-direction indicated by the direction of the double arrows. Located above the process chamber 1, in the area of the build-up chamber 7, is a scanning device 11 that directs a laser beam 13, generated by a laser 12, to the lift table 9. The laser 12, the scanning device 11, a pump 25 for supplying the protective gas to the protective gas inlet 2 as well as a drive mechanism 14 for the two lift pistons 10 are assigned to the central processing unit 15 via control leads that are not provided with reference numbers.

Figure 2:
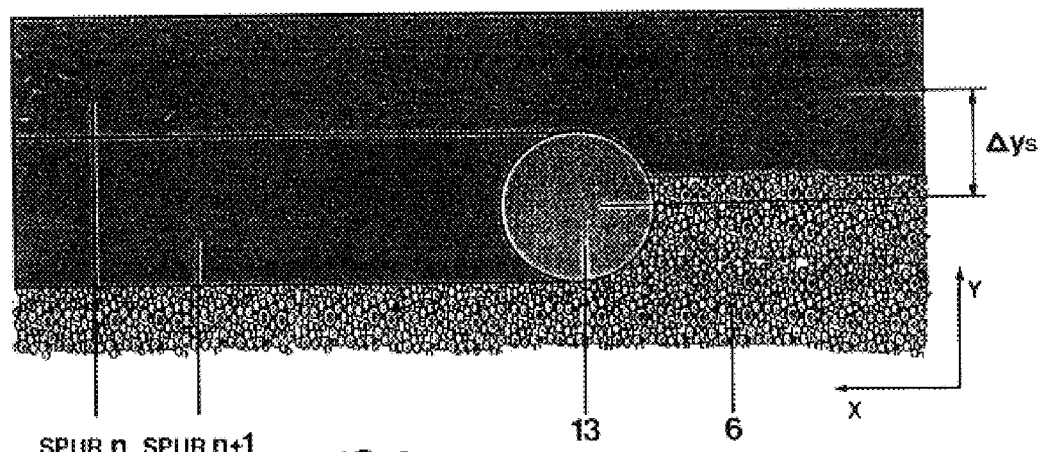
FIG. 2 is a schematic presentation of the run distance of the laser beam as an overhead view, where a part of the powder layer of a metallic powder material is molten, while in the area of the other part, the grain of the metal powder is visible.
Figure 3A:
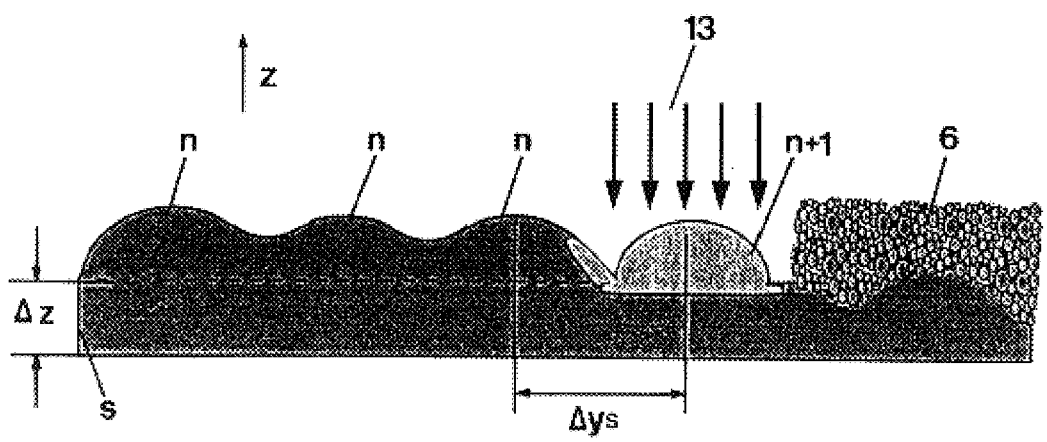
FIGS. 3A to 3C show three subsequent presentations of the manufacture of a meltmetallurgical bond between a hard contour and molten powder.
Figure 3B:
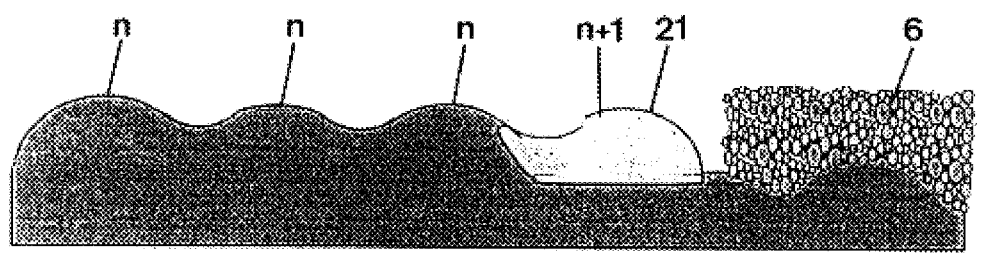
Figure 3C:
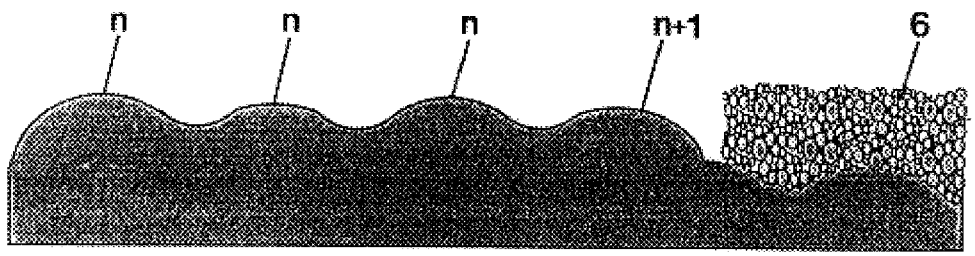

To manufacture a molded body, for example the prototype, of a component 16, first the component coordinates are entered three-dimensionally, that is in individual in z-direction divided cuts, into the processing unit 15 via an input unit 17. The cuts go through the component 16 in z-direction at distances of 0.1 mm such that, for example, 1000 cuts result for a component with a structural height in z-direction of 10 cm. After the component data are adequately processed, the lift table 9 in the build-up chamber 7 is moved to the first, upper position, where the support surface 18 is moved to the level of the ground surface 4. The lift table 8 of the storage container 5 moves to the lower position, for example, to a position as shown in FIG. 1, and fine grain powder 6 of the kind of metal that the component 16 shall be manufactured of is filled into the storage container 5. The grain of the powder 6 shall be in a range between 10 and 100 pm, with the actual grain size being dependent on the component specifications. Using a leveling device 19, indicated in FIG. 1 schematically by an arrow, the metallic powder material 6, which is lifted above the ground level 4 using the lift table 8, is distributed across the ground surface 4 of the process chamber 1 by moving this leveling device 19 in the direction of the arrow 20 to distribute a thin layer of metallic powder material, as can be seen above the ground surface 4. The leveling device 19, which is also connected to the central processing unit 15, is lifted up to a distance above the ground surface 4 that corresponds to a layer of the component 16 that is to be built up. As can be seen, a thin powder coating is then also applied above the lift table 9. When this preparative measure is finished, the laser 12 and the scanning device 11 are activated to direct the laser beam 13 to the support surface 18, or to the metallic powder material positioned on the support surface to melt, according to the coordinates, the powder that corresponds to the lowest layer of the component. As shown in FIG. 2, for this purpose, the laser beam 13 is moved in x-direction along successive runs n to melt the metallic powder material 6, as is also shown in FIG. 3A. Once the lowest layer s of the component 16, is formed, the lift table 9 is moved down by a distance $\Delta z$, such that the upper surface of this first layer S is again at about the level of the ground surface 4 of the processing chamber 1. Thereafter, the leveling device 19 is again actuated to apply a defined amount of powder layer onto the layer S of the component 16 below. Then, the laser beam 13 is again guided across the powder run by run n according to the component coordinates in order to melt the powder. Not only the metallic powder material will be molten but also the surface of the layer S below as well as each neighboring run n, that is, in FIG. 2, the laser beam that moves along run n+1 sweeps also across run n. At this, the laser beam should sweep with at least one third of its diameter across the previous run n in order to melt the hardened metal of the neighboring run. In doing so, part of run n is melted as shown in FIG. 3A as well as the layer S below, such that a molten area, designated in FIG. 3B with the reference number 21, is formed underneath the laser beam. Then, the molten powder 6 hardens, as shown in FIG. 3C, together with the metal in the previous run n to a homogeneous layer. This process is repeated until the entire component 16 is built. It is apparent that not only connected surfaces can be built at each time but also thin webs, as indicated with the component 16.

In relation to the previous run n, the laser beam 13, which is sweeping parallel to this run, should fulfill the formula $2 > d_s/\Delta y_s > 1.5$, where $d_s$ is the diameter of the laser beam and $\Delta y_s$ is the average run distance of neighboring runs. With a beam diameter $d_s = 0.35$ mm, the run distance $\Delta y_s$ is about 0.2 mm.

Typical energy densities that are applied with the laser beam 13 to the metallic powder material 6 to melt them entirely are in a range of 2 J/mm² when processing stainless steel; this energy density can be achieved, for example, with a typical laser power of about 100 W, a beam diameter of about 0.3 to 0.4 mm, a scanning rate in the direction of the axis x as shown in FIG. 2 of about 140 mm/sec, and a powder layer thickness $\Delta z$ of 0.1 mm.

Suitable lasers for this process are, depending on the radiation absorption properties of powder in use, Nd:YAG Laser, $CO_2$ Laser and Diode Laser.

It has been found that the absorption of the laser beam 13 in the metallic powder material 6 is significantly more efficient if the laser beam 13 strikes the surface under an angle, preferably an angle of 45° to the surface normal of the powder layer, because the laser radiation can penetrate the powder coating more deeply due to the angular beam incidence; any spatial angle can be selected in reference to this angle.

Figure 4:
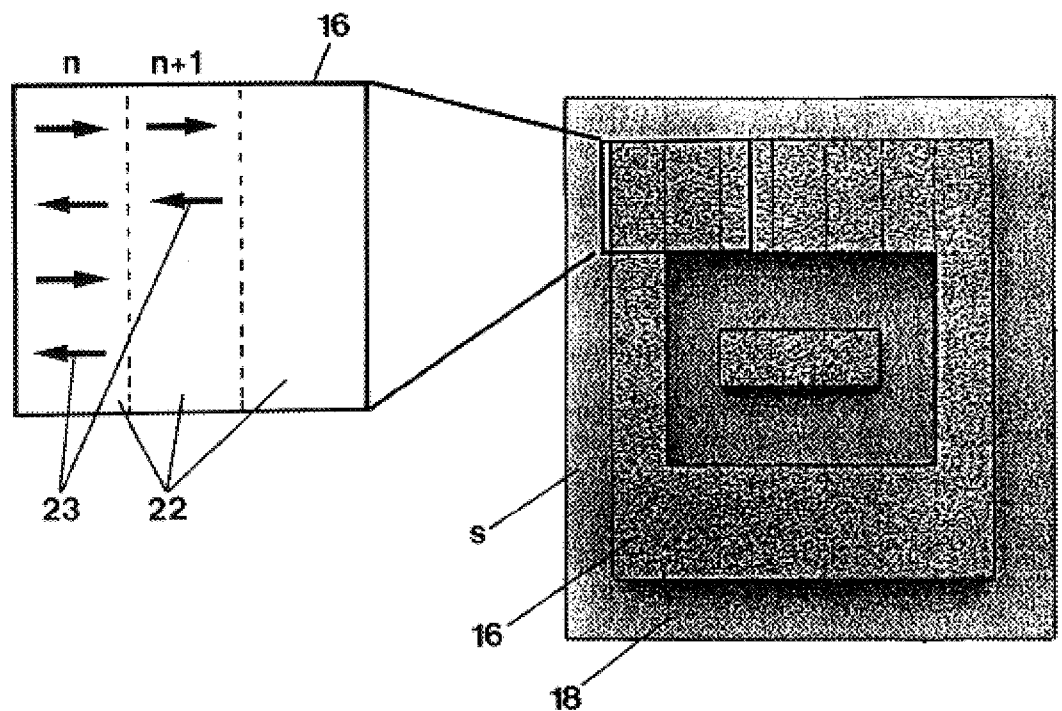
FIG. 4 shows a component, where a partial area of the component is divided into scanning vector lengths.

A significant measure for homogeneous melting of the metallic powder material, also in relation to the neighboring run n and the layer s below, is the run offset of the neighboring runs n and n+, as explained above. In that, part of a laser beam 13 strikes the powder 6, while another portion strikes the hard contour of the previously processed run n. The portion of the laser beam 13 that strikes the relatively smooth and already hard contour of the neighboring run is reflected to a greater extent than the portion that strikes the powder that is to be melted. In order for the small absorbed portion of the laser radiation to be sufficient to re-melt the hard contour on the surface of the neighboring run n, the temperature of the hard contour should still be as high as possible when the laser beam 13 strikes. This is accomplished by limiting the scanning vector length, that is, the laser travels only a short distance along the run n, before it sweeps across the next run n+1. A certain time passes before a run n+1 is processed if the scanning vectors are long. During this time, the just processed run n may cool down. When the next run is processed, the previously processed run may be cooled down far enough that the striking laser radiation may no longer be able to re-melt it. If the scanning vector length is short, the time for the previously processed run to cool down shortens as well. Thus, the run is still at a high temperature, when the next run that is right next to the just processed run can cool down. Thus, the striking laser radiation is sufficient to re-melt the surface of the already hard run, and the melt of the powder can bond, as is shown in FIGS. 3A to 3C. Using the parameters mentioned above, the maximum scanning vector length would be about 10 mm. To build up a complex geometry, a software is used that divides each layer s of a component into partial areas 22, as shown in FIG. 4, that are then swept by the laser beam 13 run by run n back and forth according to the indicated scanning vectors 23, whereby it is advantageous that the direction of the laser beam reverses at the end of a scanning vector 23 in order to travel along the next scanning vector 23.

Figure 5:
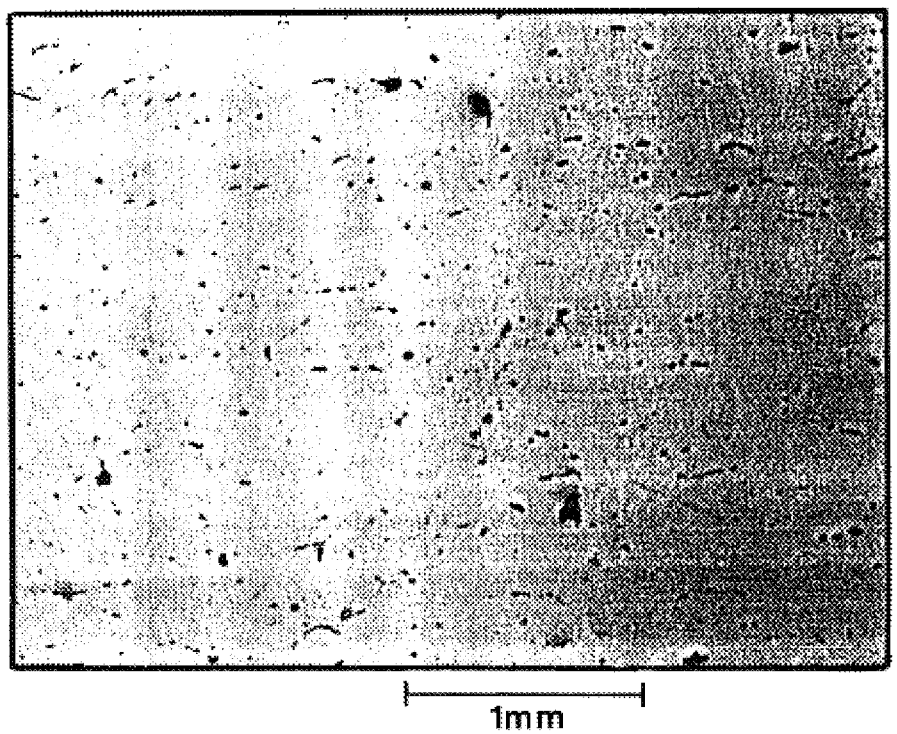
FIG. 5 shows a crosscut of a specimen made of steel, manufactured according to method subject to the invention.

FIG. 5 shows a cut image of a stainless steel component manufactured according to the method subject to the invention. Using FIG. 5, one can recognize that a very homogeneous and dense body has been built with only minimal inclusions; the density of the component is at about 99% of the theoretical material density.

One problem that can occur when melting the hard contour and the powder is oxidation on the surface of the materials, which is counteractive to such a bonding by melting process. For this reason, a laminar protective gas stream 24 is generated across the top side of the build-up chamber 7, such as is indicated by the respective arrows in FIGS. 6A and 6B. For this purpose, the protective gas, for example, nitrogen, helium or argon is fed via the protective gas inlet 2, which in the case of FIGS. 6A and 6B runs slot-like along the cross-side of the upper area of process chamber 1 and is removed at the opposite side via a slot-like protective gas outlet 3 in the lower area that is near the ground surface 4 of the process chamber 1 using the pumping device 25. Due to the low-lying protective gas outlet 3 near the ground surface 4, the protective gas stream 24 is guided closely above the upper side of the build-up chamber 7. With this arrangement, not only is a pure protective gas atmosphere maintained above the powder layer that is to be melted by the laser beam 13, but also the air that is held back in the space between the powders is removed. To keep the volume stream of the protective gas low, the process chamber 1 should be designed very flat, that is, it has a height 26 of not more than 20 mm. A typical volume stream of the protective gas is 60 L/min; the pressure in this area should be between 0.2 and 0.6 MPa.

Figure 6A:
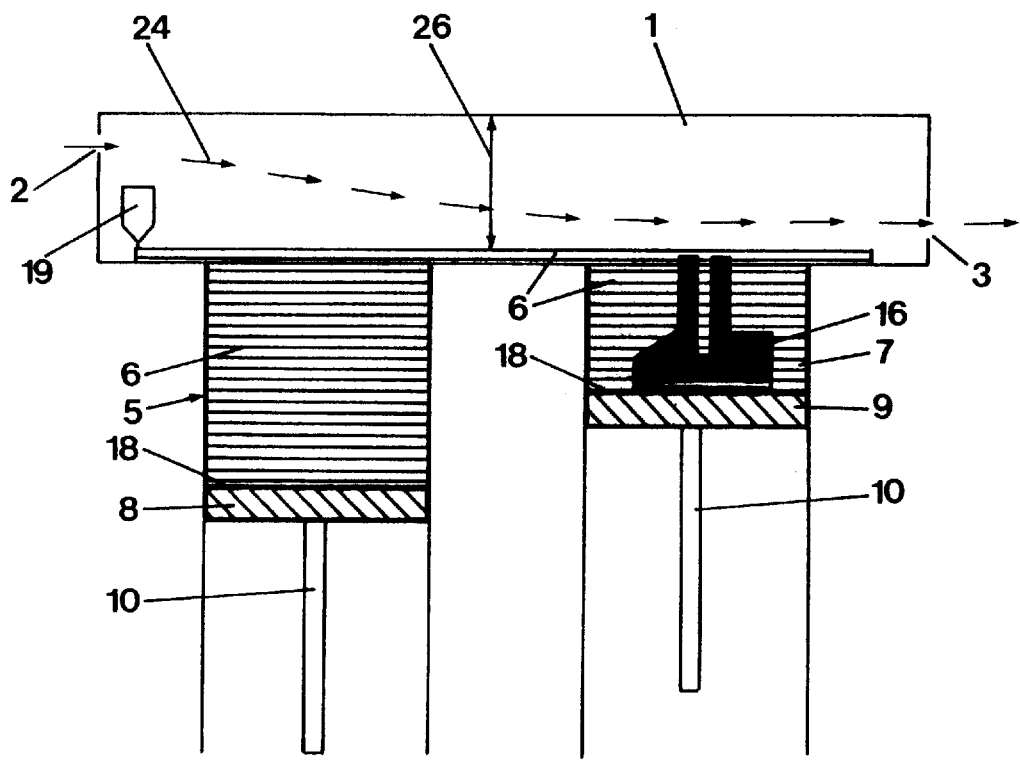
FIG. 6A is a schematic side view of a device to explain the gas stream in the process chamber.
Figure 6B:
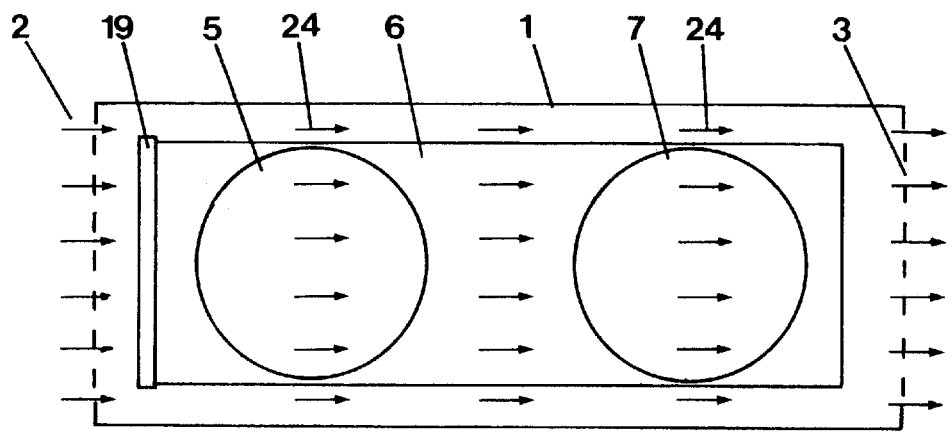
FIG. 6B is an overhead view of the device shown in FIG. 6A.
Figure 7A:
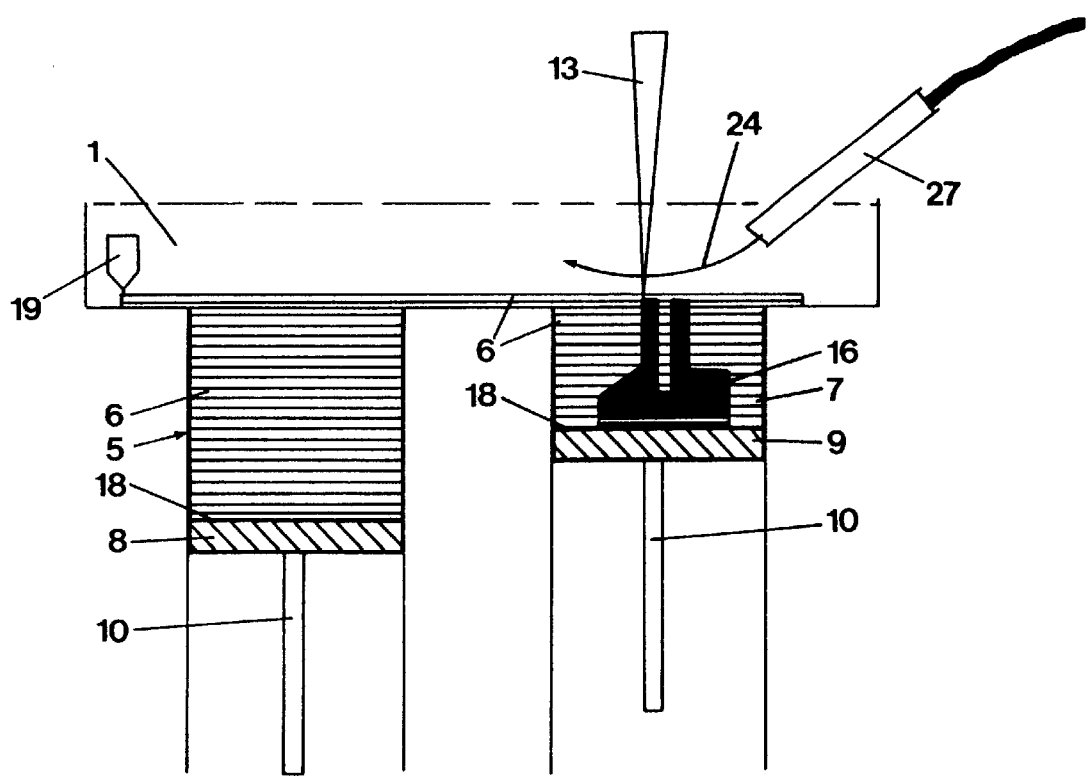
FIG. 7A shows a device according to FIG. 6A, where the gas stream is applied using a gas nozzle.
Figure 7B:
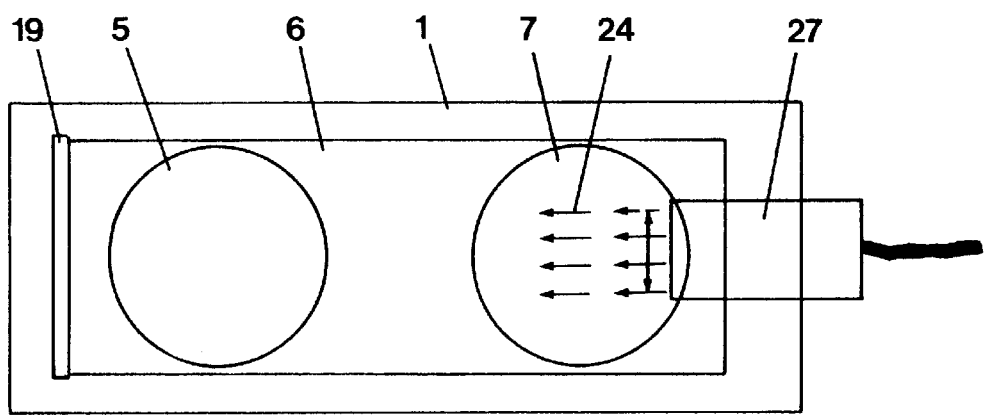
FIG. 7B is an overhead view of the device shown in FIG. 7A.

Alternative to the design in FIGS. 6A and 6B, in order to maintain a laminar protective gas stream above the build-up chamber 7, the design may be modified as shown in FIGS. 7A and 7B. In this alternative embodiment, the protective gas stream 24 is directed to the melting place via a nozzle 27. This nozzle 27 generates a locally limited protective gas stream 24 at the melting place. To supply a stream of protective gas to the entire area where the powder 6 is melted, the nozzle 27 travels together with the laser beam 13. If the width of the nozzle 27 is greater than the maximum scanning vector length 23, then the nozzle 27 is moved only vertically to the scanning direction within a partial area 22, because the melting area is completely shielded parallel to the scanning direction. With this method, an effective laminar stream directly above the area just melted by the laser beam 13 can be achieved as well, preventing oxidation on the surface of the powder as well as at the bordering previously molten surfaces.

There has thus been shown and described a novel selective laser sintering at melting temperature which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method for manufacturing a molded body, particularly a prototype of a product or component, a tool prototype or spare part, in accordance with three-dimensional CAD data of a model of a molded body by depositing layers of a metallic material in powder form, whereby several layers of the powder are successively deposited one on top of the other, whereby each layer of powder is heated to a specified temperature by means of a focused laser beam applied to a given area corresponding to a selected cross-sectional area of the model of the molded body, before depositing the next layer and where the laser beam is guided over each layer of powder in accordance with the CAD cross-sectional data of the selected cross-sectional area of the model in such a way that each layer of powder is fixed to the layer below, the improvement wherein the metallic material in powder form is applied in the form of a metallic powder free of binding and fluxing agents, wherein it is heated by the laser beam to melting temperature, that the energy of the laser beam is chosen in such a way that the layer of metallic powder is fully molten throughout its layer thickness at the point of impact of said laser beam, wherein the laser beam is guided across the specified area of powder in several runs in such a way that each run of the laser beam partly overlaps the preceding run, and wherein a protective gas atmosphere is maintained above the interaction zone of the laser beam and the metallic powder.

2. Method according to claim 1, wherein a run distance $\Delta y_s$ of neighboring runs is maintained according to the formula $2 > d_s/\Delta y_s > 1.5$, where $d_s$ is the diameter of the laser beam in the plane of the melt.

3. Method according to claim 2, wherein the diameter of the laser beam is set to between 0.2 and 0.5 mm, preferably to a maximum of 0.35 mm.

4. Method according to claim 3, wherein the diameter of the laser beam is set to a maximum of 0.35 mm.

5. Method according to claim 3, each layer of the layer-like structure is divided into partial areas, whereby each partial area in turn is divided into scanning vector lengths that the laser beam sweeps successively.

6. Method according to claim 5, wherein the maximum scanning vector length is set to 20 mm.

7. Method according to claim 6, wherein the maximum scanning vector length is set to approximately 10 mm.

8. Method according to claim 5 wherein the individual scanning vector lengths are processed by the laser beam in a back and forth motion.

9. Method according to claim 1, wherein the laser beam is applied at an angle to the surface normal of the powder layer.

10. Method according to claim 9, wherein the laser beam is applied at an angle of about 45° to the surface normal of the powder layer.

11. Method according to claim 1, wherein the respective powder layer made of metallic powder material is applied at a thickness between 0.05 mm and 0.2 mm.

12. Method according to claim 11, wherein the respective powder layer made of metallic powder material is applied at a thickness of about 0.1 mm.

13. Method according to claim 1, wherein the scanning speed of the laser beam is set to a value between 50 and 250 mm/sec.

14. Method according to claim 13, wherein the scanning speed of the laser beam is set to a value of about 150 mm/sec.

15. Method according to claim 1, wherein an energy density between 1 and 3 J/mm² is generated in the melt area.

16. Method according to claim 1, wherein a protective gas stream is maintained across the surface of the molded body while the metallic powder material is molten to build the molded body.

17. Method according to claim 1, wherein the protective gas stream is supplied at one side of the molded body and removed at the other side of the molded body.

18. Method according to claim 16, wherein the protective gas stream is maintained in a narrow, limited volume above the molded body to be built up.

19. Method according to claim 18, wherein the protective gas stream is maintained at a maximum of 20 mm above the molded body to be built up.

20. Method according to claim 16, wherein the protective gas is maintained at a pressure of greater than 0.1 MPa.

21. Method according to claim 20, wherein the protective gas is maintained at a pressure in the range of 0.2 to 0.6 MPa.

22. Method according to claim 16, wherein the protective gas stream is maintained in the area of the respective molten location using a nozzle, whereby the nozzle is guided together with the laser beam.

23. Method according to claim 22, wherein the metallic material in powder form is applied with a grain of <100 μm.

* * * * *